United States Patent
Fuse

[11] Patent Number: 6,135,458
[45] Date of Patent: Oct. 24, 2000

[54] STATIC PRESSURE NON-CONTACT GAS SEAL

[75] Inventor: Toshihiko Fuse, Hyogo, Japan

[73] Assignee: Nippon Pillar Packing Co., Ltd., Osaka, Japan

[21] Appl. No.: 09/331,856

[22] PCT Filed: Nov. 21, 1997

[86] PCT No.: PCT/JP97/04279

§ 371 Date: Jun. 28, 1999

§ 102(e) Date: Jun. 28, 1999

[87] PCT Pub. No.: WO99/27281

PCT Pub. Date: Jun. 3, 1999

[51] Int. Cl.$^7$ .................................................... F16J 15/34
[52] U.S. Cl. .................... 277/401; 277/400; 277/399; 277/382
[58] Field of Search .................... 277/409, 411, 277/422, 400, 401, 399, 382, 379, 377

[56] References Cited

U.S. PATENT DOCUMENTS

| | | | |
|---|---|---|---|
| 2,531,079 | 11/1950 | Payne | 277/390 X |
| 3,486,760 | 12/1969 | Tracy | 277/370 |
| 3,498,620 | 3/1970 | Wiese | 277/401 |
| 3,526,408 | 9/1970 | Tracy | 277/391 X |
| 3,589,738 | 6/1971 | Tracy | 277/401 X |
| 3,804,424 | 4/1974 | Gardner | 277/390 X |
| 3,917,289 | 11/1975 | Ivanov et al. | 277/400 |
| 4,196,911 | 4/1980 | Matsushita | 277/401 |
| 4,447,063 | 5/1984 | Kotzur et al. | 277/411 X |
| 4,523,764 | 6/1985 | Albers et al. | 277/400 |
| 5,052,694 | 10/1991 | Lipschitz | 277/388 |
| 6,059,293 | 5/2000 | Azibert et al. | 277/401 X |
| 6,068,263 | 5/2000 | Azibert et al. | 277/401 X |
| 6,068,264 | 5/2000 | Azibert et al. | 277/401 X |

*Primary Examiner*—Terry Lee Melius
*Assistant Examiner*—Robert G. Santos
*Attorney, Agent, or Firm*—Griffin & Szipl, P.C.

[57] ABSTRACT

A static pressure-type generating non-contact gas seal in which a diameter d2 of a second outer circumferential portion (42) of a stationary seal ring (4) in contact with a second O-ring (62) is made smaller than the diameter d1 of a first outer circumferential portion (41) of the stationary seal ring (4) in contact with a first O-ring (62). Because of d1>d2, the pressure of a seal gas (8) led to a first closed space (71) produces a force thrusting the stationary seal ring (4) toward a rotary seal ring (2). A second closed space (72) communicates with an inside region (F) through a back pressure lead-in path (45). The inside gas pressure in the second closed space (72) acts as back pressure on the stationary seal ring (4). The groove width b of static pressure generating grooves (9) formed on the seal end face of the stationary seal ring (4) is decided so that a ratio of the groove width d to the radial width, that is, the seal face width B of the stationary seal ring end face (40), i.e. b/B, is $0.05 \leq b/B \leq 0.03$. The radial distance Bo from the outer edge of the seal end face (40) of the stationary seal ring to the static pressure generating groove (9) or the radial distance Bi from the inner edge of the seal end face (40) of the stationary seal ring to the static pressure generating groove (9) are selected so that $0.3\ B \leq Bo \leq 0.7\ B-b$ or $0.3\ B \leq Bi \leq 0.7\ B-b$ is achieved, provided that $B-b=Bo+Bi$. Groove depth L of the static pressure generating groove (9) is 0.3 to 1.0 mm. The pressure of the seal gas (8) led to the static pressure generating grooves (9) is 0.5 to 1.5 bar higher than the pressure in inside region (F). It is also designed so that the balance ratio K is $0.8 \leq K \leq 0.9$, in which the balance ratio K is given by the equation:

$$K=((D2)^2-(Dm)^2)/((D2)^2-(D1)^2),$$

being defined by the diameter Dm of the inner cylinder portion (31) of the seal casing at the place where the inner circumferential portion of the third O-ring (63) comes in contact and the inside and outside diameters D1 and D2 of the seal ring end faces (20, 40).

7 Claims, 8 Drawing Sheets

STATIC PRESSURE NON-CONTACT GAS SEAL

FIELD OF THE INVENTION

The present invention relates to a static pressure-type non-contact gas seal suitable for use in different types of rotary equipment, such as turbines, blowers, compressors, agitators, and rotary valves, for different kinds of gases including toxic gas, flammable gas, explosive gas, and dust-mixed gas.

BACKGROUND OF THE INVENTION

A static pressure type non-contact gas seal 101 as formed and shown in FIG. 8 is known.

As shown in FIG. 8, the prior art seal 101 comprises a rotary seal ring 102 fixed on a rotary shaft 110, a stationary seal ring 104 held slidable in the axial direction via a pair of O-rings 106 on the circular inner circumferential portion of a seal casing 103 and springs 105 mounted between the back side of the stationary seal ring 104 and the seal casing 103 for pressing the stationary seal ring 104 against the rotary seal ring 102. And this prior art seal is so designed that the seal end faces 120 and 140 formed on the opposing ends of the two seal rings 102 and 104 are held in a non-contact state by a static pressure acting therebetween such that a circular area between the seal end faces 120 and 140 seals off the sealed fluid region at the outer periphery side, i.e. the inside region F of the machine, from the outside (atmospheric) region A at the inner periphery side.

The stationary seal ring 104 is provided with shallow grooves or static pressure generating grooves 109 on the seal end face 140. Into these grooves are introduced a seal gas 108 such as nitrogen gas compressed to a higher level than the pressure of the inside region F of the machine to produce a static pressure at the circular area between seal end faces 120 and 140, thus holding the seal end faces 120 and 140 in a non-contact state. In other words, the seal gas 108 led into the static pressure generating grooves 109 forms a static pressure fluid film between the seal end faces 120 and 140. Because of the presence of this fluid film, the seal end faces 120 and 140 are held in a non-contact state, with the inside region F of the machine sealed off from the outside region A. The seal gas 108 whose pressure is higher than that of the inside region F can leak through between the seal end faces 120 and 140 into the inside region F of the machine and the outside region A, but the inside gas or sealed fluid in the inside region F can not penetrate into the area between the seal end faces 120 and 140, and, hence, is not allowed to leak out to the outside region A.

To the static pressure generating grooves 109, the seal gas 108 is supplied through a continuous gas supply channel 180 formed in the seal casing 103 and the stationary seal ring 104 as shown in FIG. 8. The gas supply channel 180 comprises a circular closed space 171 and two passages 181 and 182. The circular closed space 171 is formed between the inner circumferential portion of the seal casing 103 and the outer circumferential portion of the stationary seal ring 104 and closed by a pair of O-rings disposed side by side in the axial direction. The first passage 181 is formed in the seal casing 103 through which the seal gas 108 is led into the closed space 171. The second passage 182 is provided in the stationary seal ring 104. Through this passage 182, the seal gas 108 supplied to the closed space 171 is led to the static pressure generating grooves 109 via an orifice 183. The seal gas 108 introduced into the static pressure generating grooves 109 flows out to the inside region F and the outside region A through between the seal end faces 120 and 140, holding the seal end faces 120 and 140 in a noncontact state by a fluid film formed by a static pressure. Between the seal end faces 120 and 140, an opening force and a closing force are in equilibrium and balanced, thereby keeping the two seal end faces in a non-contact state. The opening force is a force resulting from the static pressure produced by the seal gas 108 led to the static pressure generating grooves 109 and the pressure inside the machine acting on the outside circumferential edge 148 of the stationary seal ring 104 (the circular face outside the seal end face 140 of the stationary seal ring 104). The closing force is produced by the spring 105 that thrusts the stationary seal ring 104 against the rotary seal ring 102. The pressure of the seal gas 108 which is led to the static pressure generating grooves 109 is regulated depending of the pressure inside the machine and set to a higher level than the latter. The spring force (spring load) applied by the spring 105 which determines the closing force is so adjusted according to the pressure of the seal gas 108 that the gap between the seal end faces 120 and 140 may be proper (generally 5 to 15 $\mu$m). The seal gas is squeezed by the orifice 183 before being led to the static pressure generating grooves 109 such that when the gap between the seal end faces 120 and 140 changes, the gap will be automatically adjusted and maintained properly. In other words, if the gap between the seal end faces 120 and 140 is widened by, for instance, vibration of the rotary components, the amount of the seal gas flowing into between the seal end faces 120 and 140 from the static pressure generating grooves 109 and the amount of the seal gas supplied to the static pressure generating grooves 109 through the orifice 183 will be put out of balance. As the pressure decreases in the static pressure generating grooves, the opening force will be smaller than the closing force with the result that the gap between the seal end faces 120 and 140 is narrowed to a proper size. Conversely, if the gap between the seal end faces 120 and 140 becomes narrow, the pressure in the static pressure generating grooves 109 will rise through the aforesaid mechanism of the orifice with the result that the opening force exceeds the closing force for enlarging the gap between the seal end faces 120 and 140 to a proper amount.

The prior art seal 101, like the dynamic pressure type non-contact gas seal, can effectively seal the gas inside the machine for a long time with the seal end faces 120 and 140 maintained in a non-contact state and with no seizing inflicted on the faces 120 and 140. Furthermore, the prior art seal 101 is effective in sealing the kind of gas which cannot be sealed by the dynamic pressure-type non-contact gas seal and offers a greater possibility of application than the latter. That is to say, the dynamic pressure-type gas seal, as is known, has dynamic pressure generating grooves formed on one seal end face that rotates relatively. With operation of these dynamic pressure generating grooves, a dynamic pressure is produced between the seal end faces by the gas inside the machine so that the seal end faces are kept in a non-contact state. In principle, this seal tolerates leaking of the gas inside the machine to the outside through between the seal end faces. Therefore, the dynamic pressure-type non-contact gas seal cannot be used for the kind of gas which must not be leaked outside, including toxic gas, flammable gas, and explosive gas. On the other hand, the prior art static pressure-type non-contact seal 101 is so constructed that the seal gas 108 with a higher pressure than the pressure inside the machine is supplied to the area between the seal end faces 120 and 140, thus completely preventing leakage of the gas inside the machine to the outside, and can effectively work with rotary equipment employed with such gases as toxic gas, flammable gas, and explosive gas.

While the prior art seal 101 has an advantage over the dynamic pressure type non-contact gas seal, the former present problems as described below when operated at a high level of pressure inside the machine, and cannot work very well with rotary equipment operated at the high pressure.

With the prior art seal 101, the pressure of the seal gas 108 is set higher than the pressure inside the machine to keep the gas inside the machine from leaking out. Under high pressure operating conditions, the opening force would be extremely great. To counter the great opening force, the spring force of the spring 105 has to be set higher than when working under low pressure conditions so as to maintain the gap properly between the seal end faces 120 and 140 with the two forces balanced in equilibrium. On the other hand, when the operation is suspended with the supply of the seal gas 108 cut off, the opening force and the closing force will be put out of balance. With the stationary seal ring 104 pressed against the rotary seal ring by the spring 105, the gap between the seal end faces 120 and 140 will be closed. Hence, if the spring force of the spring 105 is great, the stationary seal ring 104 may violently crash against the rotary seal ring 102 when the supply of the seal gas 108 is cut off, which may damage the seal rings 102 and 104 or the seal end faces 120 and 140.

Another problem with the prior art seal 101 is that the closing force, which is produced by the spring load alone and inevitably stays constant, cannot adapt itself to change in the inside pressure. Hence, under the conditions that the pressure inside the machine is changeable, the prior art seal 101 cannot work as an effective seal and is not suitable for use in rotary equipment operated under such conditions.

That is to say, the prior art seal 101 is so designed that the seal end faces 120 and 140 are kept in a non-contact with the closing force and the opening force balanced in equilibrium, wherein the closing force is produced by the spring load and the opening force results from the pressure of the seal gas 108 led to the static pressure grooves 109 and the pressure inside the machine acting on the outside circumferential edge 148 of the stationary seal ring 104. In this regard, the spring load and the pressure of the seal gas 108 are fixed. If the pressure inside the machine changes and, as a result, the opening force changes in accordance with the changes in the pressure inside the machine, the opening force and the closing force will be put out of balance. As a result, the gap between the seal end faces 120 and 140 cannot be maintained properly, thereby failing to satisfactorily seal the gas inside the machine. If, for example, the inside pressure exceeds the designed level on the basis of which the seal gas pressure and the spring load have been set, the closing force will be insufficient, thereby allowing the seal end faces 120 and 140 to open more than necessary, which can cause the inside gas to leak out to the region A outside the machine. If, on the other hand, the inside pressure falls below the designed pressure level, the opening force will be insufficient, which may result in the seal end faces 120 and 140 coming in contact with each other.

Where the pressure inside the machine fluctuates, it may be possible that the pressure of the seal gas 108 is regulated and controlled according to the fluctuations in the pressure inside the machine. In the prior art seal 101, however, since the closing force depends on the spring load alone and is fixed, such method cannot be adopted. In other words, if the opening force is change through pressure control of the seal gas 108, the closing force will become too large or too small in relation to the opening force. In the end, that would produce the same problem as encountered with a fixed pressure of the seal gas 108.

As set forth above, the prior art seal 101 cannot work effectively under high pressure or pressure changing conditions, and its application possibility is quite limited.

SUMMARY OF THE INVENTION

It is an object of the present invention to provide a static pressure-type non-contact gas seal which can effectively seal off a sealed fluid irrespective of the pressure conditions in the region of the sealed fluid.

It is another object of the present invention to provide a static pressure-type non-contact gas seal which reduces the required spring load as much as possible to preclude the possibility of damaging the seal parts due to an impact of one seal end face against the other.

It is still another object of the present invention to provide a static pressure-type non-contact gas seal which is employable over a wide pressure range.

The foregoing objects of the present invention are attained by a static pressure-type non-contact gas seal configured as described in the following.

The static pressure-type non-contact gas seal according to the present invention has a seal casing comprising a casing inner cylinder portion, an inner circumferential portion of the seal casing concentrically surrounding the inner cylinder portion, and a ring-shaped casing wall portion connecting those foregoing two portions. A rotary seal ring is fixed on a rotary shaft concentrically running through the casing inner cylinder portion. In the seal casing, a stationary seal ring is held opposite to the rotary seal ring via a first O-ring and a second O-ring in such a state that the stationary seal ring can slide in the axial direction.

The first and second O-rings are disposed between the outer circumferential portion of the stationary seal ring and the inner circumferential portion of the seal casing, and arranged side by side in the axial direction with a specific interval provided therebetween such that the stationary seal ring is slidable in the axial direction. The first seal ring is positioned closer to the rotary seal ring than is the second seal ring.

A third O-ring is provided between the inner circumferential portion of the stationary seal ring and the inner cylinder portion of the seal casing, holding the stationary seal ring slidably in the axial direction and also sealing secondarily the stationary seal ring. The opposing ends of the two seal rings have a rotary seal end face and a stationary seal end face identical in inside and outside diameters.

Springs, which thrust the stationary seal ring against the rotary seal ring, are placed between the stationary seal ring and the casing wall portion. A ring-shaped space formed between the inner circumferential portion of the seal casing and the outer circumferential portion of the stationary seal ring is a first closed space closed by the first and second O-rings. Another ring-shaped space formed between the casing wall portion and the stationary seal ring is a second closed space sealed by the second and third O-rings. A plurality of static pressure generating grooves in the form of a circle concentric with the stationary seal end face are formed on the stationary seal end face, which is the seal end face of the stationary seal ring. A continuous seal gas supply channel communicating with the grooves is formed, which passes through the seal casing and the stationary seal ring.

Through the seal gas supply channel, the seal gas, whose pressure is higher than the pressure in the sealed gas region at the outer circumferential side of the two seal ends, is led to the static pressure generating groove area by way of the first closed space.

The stationary seal ring is formed so that a second outer circumferential portion in contact with the inside of the second O-ring is smaller in diameter than a first outer circumferential portion in contact with the first O-ring. Because the difference in diameter is provided between the first and second outer circumferential portions, the seal gas supplied to the first closed space produces a force thrusting the stationary seal ring against the rotary seal ring. This thrusting force works to close the seal end faces. Thus this arrangement reduces the spring load, in comparison with a case where a closing force necessary to counter the opening force is obtained by the spring load alone.

Furthermore, the stationary seal ring is designed so that the sealed fluid region and the second closed space communicate with each other through a back pressure lead-in path, so that the pressure in the sealed fluid region may act as back pressure on the stationary seal ring. This back pressure works to thrust the stationary seal ring against the rotary seal ring. The thrusting force serves as the closing force and further alleviates the spring load. Even under operating conditions where the pressure is high in the sealed fluid region, therefore, the spring force can be set relatively low. And when the operation is suspended, with the supply of seal gas cut off, there is no concern that the spring load will allow the seal end faces to impact each other, damaging the seal ends. In addition, the closing force changes in proportion to changes in the pressure of the sealed fluid region. Even when the pressure changes in the sealed fluid region, therefore, the closing force and the opening force will be well balanced, thereby exhibiting a good sealing function.

It is also noted that the following features make it possible to form a proper static pressure fluid film of the seal gas between the seal end faces, producing an effective seal, as will be described in detail later.

The aforesaid required features are as follows: $0.05 \leq b/B \leq 0.3$ is to be satisfied, where b is a groove radial width or width measured in the radial direction of the static pressure generating grooves formed on the stationary seal end face and B is a seal face width of the stationary seal end face. With $B-b=Bo+Bi$, $0.3B \leq Bo \leq 0.7B-b$ or $0.3B \leq Bi \leq 0.7B-b$ must be satisfied where Bo is a radial distance between the static pressure generating groove and the outer circumferential end of the stationary seal end face and Bi is a radial distance between the static pressure generating groove and the inner circumferential end of the stationary seal end face. The other features: The groove depth L of the static pressure generating groove is 0.3 to 1.0 mm. The distance in the circumferential direction of the stationary seal end face between neighboring static pressure generating grooves is set to be equal to the groove width.

Also, with the following features the applicable pressure range is substantially widened.

The pressure of the seal gas introduced to the static pressure generating groove (i.e., the pressure of the seal gas in the static pressure generating groove) is set 0.5 to 1.5 bar higher than the pressure in the sealed fluid region. Furthermore, $0.8 \leq K \leq 0.9$ must be satisfied where K is a balance ratio $((D2)^2-(Dm)^2)/((D2)^2-(D1)^2)$ where: Dm is a diameter, in the case where the third O-ring stopper is formed in the stationary seal ring, of a portion of the seal casing which the inner circumferential portion of the third O-ring contacts, or, in the case where the third O-ring stopper is formed in the seal casing inner cylinder portion, of a portion of the stationary seal ring which the outer circumferential portion of the third O-ring contacts; D1 is an inside diameter of the stationary seal end face; and D2 is an outside diameter of the same. The third O-ring stopper is to prevent the third O-ring from being moved toward the rotary seal ring by pressure of the sealed fluid led to the second closed space.

PREFERRED EMBODIMENTS OF THE INVENTION

Figure 1:
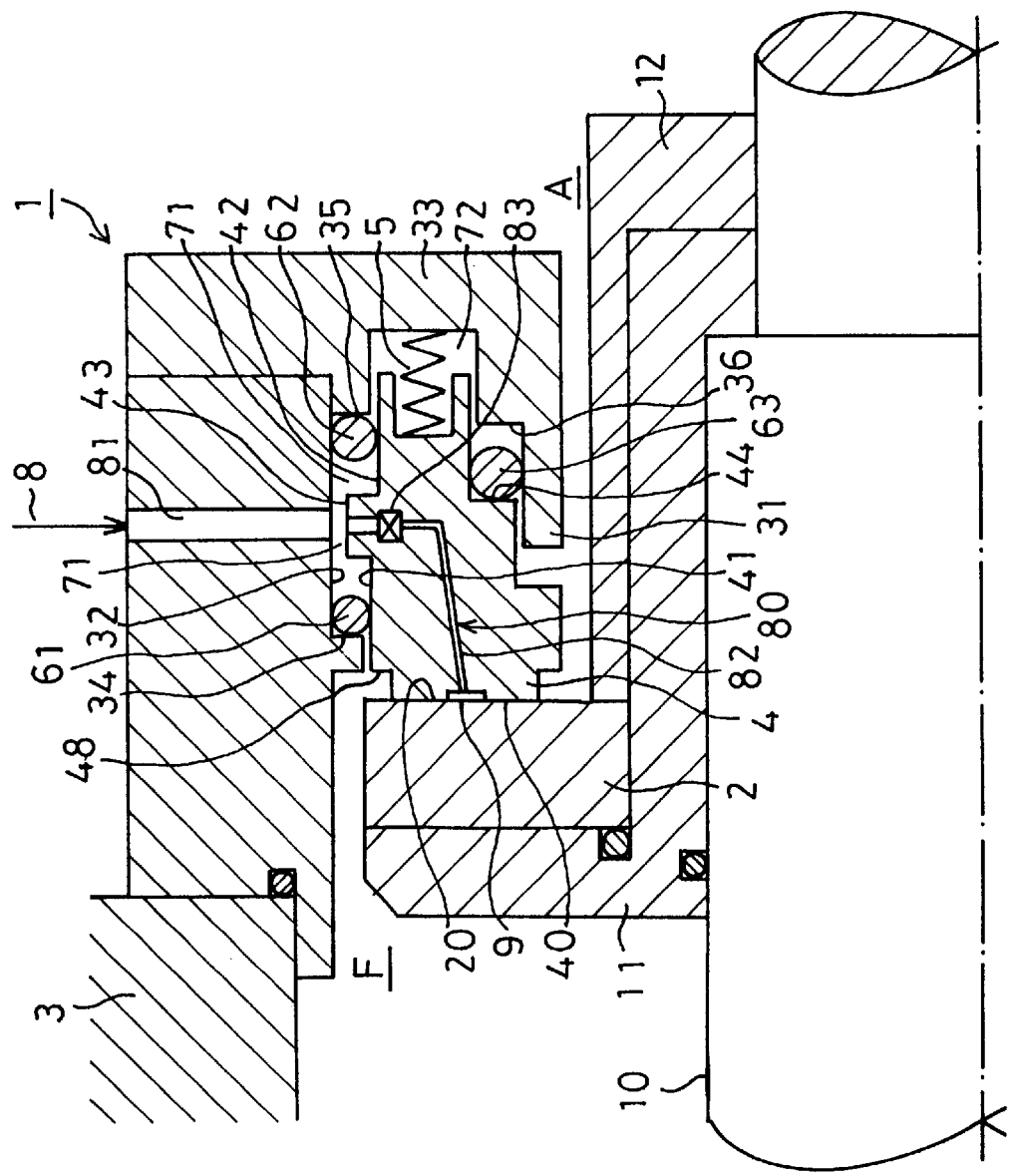
FIG. 1 is a longitudinal half sectional view showing a non-contact gas seal example of the present invention.

FIGS. 1 to 4 show a preferred embodiment of the static pressure-type non-contact gas seal of the present invention. It is to be understood that, referring to FIG. 1 or FIG. 2, for the sake of convenience, the terms front, before, forth, or forward used in the following description denote right, or to or relating to the right, and the terms rear, behind, back, or backward mean left, or to or relating to the left.

The static pressure-type non-contact gas seal 1 shown in FIGS. 1 to 4 is identical with the prior art gas seal 101 in basic sealing principle, and is formed so that a rotary seal ring 2 fixed on a rotary shaft 10 and a stationary seal ring 4 held by a seal casing 3 are maintained in a non-contact state with a fluid film formed in between by a static pressure, thus sealing off the sealed fluid region F at the outer circumferential side of a ring shaped region between the two seal rings 2 and 4 from the non-sealed fluid region A at the inner circumferential side thereof. In this example, the sealed fluid region F is a high pressure gas region communicating with the inside of the rotary machine in which the non-contact gas seal 1 is mounted. This region F will be referred to as "inside region" or simply "inside", the sealed fluid in the region as "inside gas", and the pressure there as "inside pressure". Conversely, the non-sealed gas region A is a region outside the rotary machine which communicates with the atmosphere. And this region A will be referred to as "outside region" or simply "outside". It is understood that the pressure values are all indicated in gauge pressure (bar) in relation to atmospheric pressure.

The seal casing 3 comprises an inner cylinder portion 31, a circular inner circumferential portion 32 concentrically surrounding the foregoing portion 31, and a ring-shaped casing wall portion 33 connecting those two.

The rotary shaft 10 extends concentrically through the inner cylinder portion 32 of the casing, with the rotary seal ring 2 mounted forwardly of the inner cylinder portion 31 and fixed on the rotary shaft 10 by means of sleeve-shaped fixing members 11 and 12.

Figure 2:
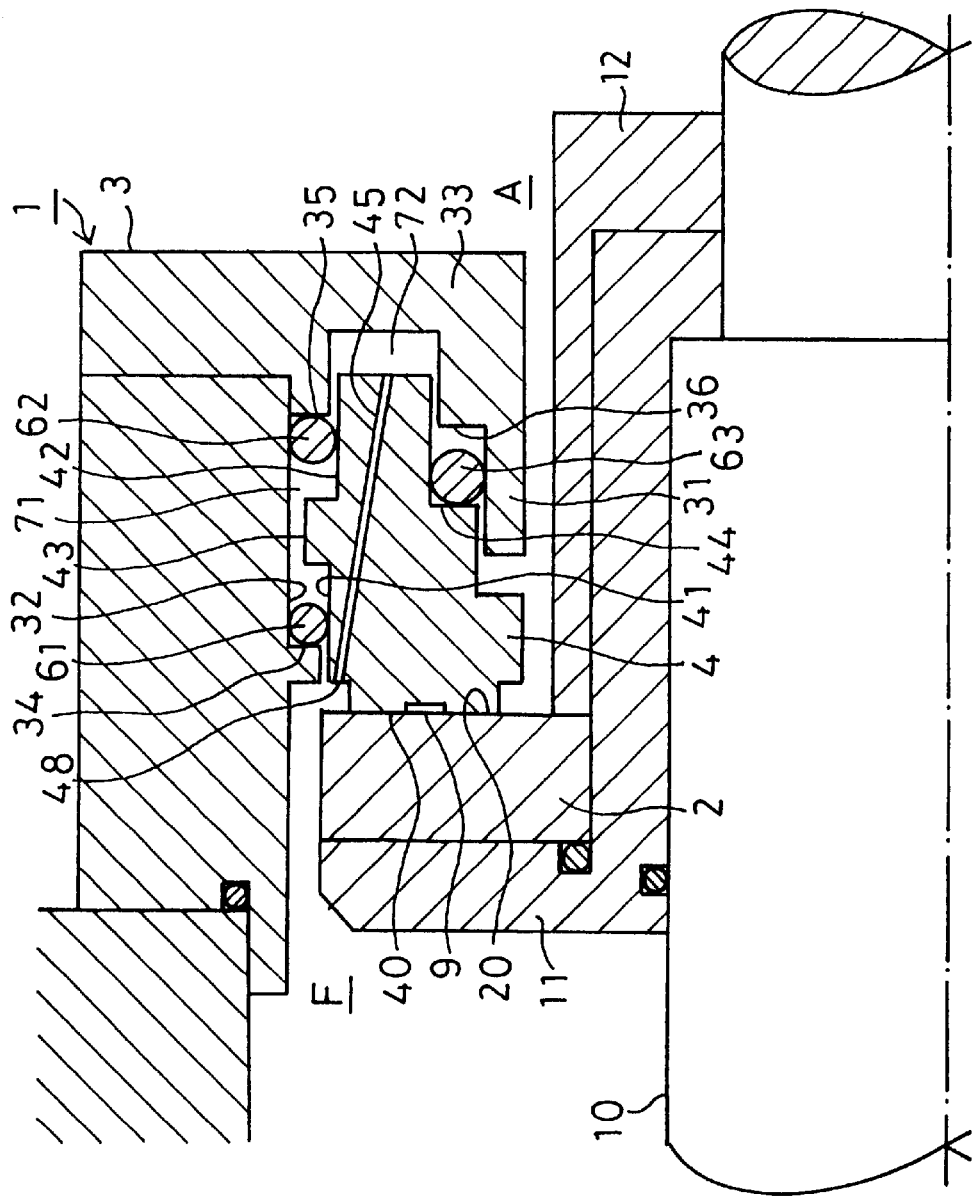
FIG. 2 is a longitudinal half sectional view, taken on a line different from that in FIG. 1, showing the same non-contact gas seal example of the present invention.

The stationary seal ring 4 is placed in a ring-shaped space formed between the inner cylinder portion 31 of the casing and the inner circumferential portion 32 of the same, held slidably in the axial direction by a first and second O-rings 61 and 62 and a third O-ring 63 and placed backwardly of the rotary seal ring 2 as shown in FIGS. 1 and 2. In other words, an outer circumferential portion of the stationary seal ring 4 is held by the inner circumferential portion 32 of the seal casing via the forward first O-ring 61 and the backward second O-ring 62, the two O-rings arranged apart in the axial direction with a specific interval provided therebetween. An inner circumferential portion of the stationary seal ring 4 is held by an outer circumferential portion of the inner cylinder portion 31 of the seal casing via the third O-ring 63. Though not shown in the drawings, the stationary seal ring 4 has engaging holes on the back end to which are inserted rotation-preventing pins planted in the casing wall portion 33. That keeps the stationary seal ring from rotating in relation to the seal casing 3 while permitting the stationary seal ring to move within a specific range in the axial direction.

On the opposing ends of the two seal rings 2 and 4 are formed the respective seal end faces with the same inside diameter D1 and the same outside diameter D2, a rotary seal end face 20 on the rotary seal ring 2, and a stationary seal end face 40 on the stationary seal ring 4. The inside diameter D1 and the outside diameter D2 of the respective seal end faces 20 and 40 are set on the basis of seal conditions, for instance, the diameter of the rotary shaft 10. The rotary seal end face 20, which is a seal end face of the rotary seal ring 2, and the stationary seal end 40, which is a seal end face of the stationary seal ring 4, are ring-shaped smooth surfaces perpendicular to the shaft axis. The materials of the respective seal rings 2 and 4 are selected, as is known, on the basis of the seal specifications and other conditions. In the present example, the stationary seal ring 4 is made of carbon. The rotary seal ring 2 is formed of stainless steel (JIS classification SUS 316). The rotary seal end face 20 of rotary seal ring 2 is preferably provided with a ceramic coated layer 21, for instance of $CrO_2$, as shown in FIG. 3.

Figure 3:
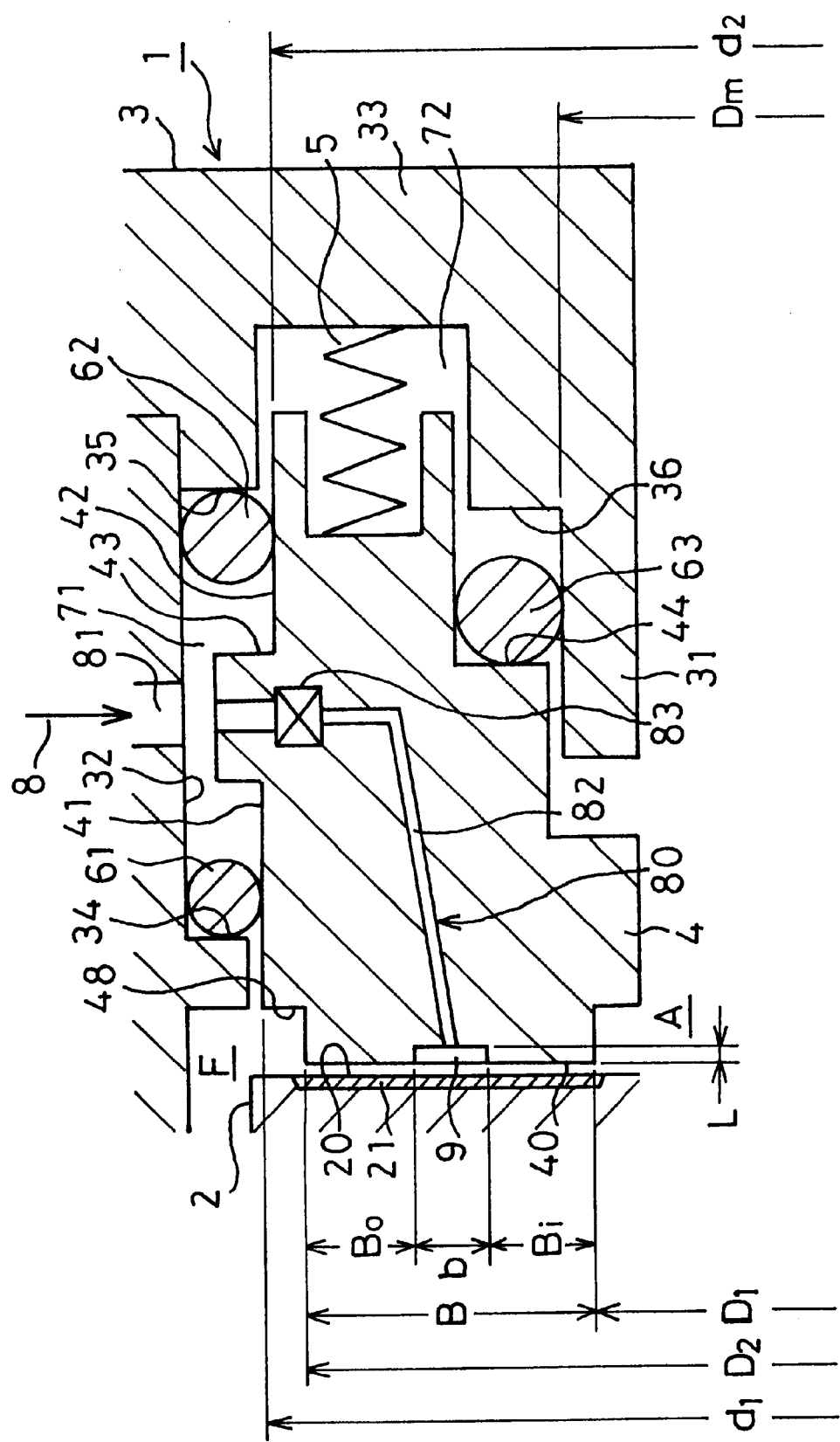
FIG. 3 is an enlarged view showing the main part of FIG. 1.

The first and second O-rings 61 and 62 are placed between and suitably compressed by the outer circumferential portion of the stationary seal ring 4 and the inner circumferential portion 32 of the seal casing, as shown in FIGS. 1 to 3. Thus the O-rings provide a secondary seal in the space between the outer circumferential portion of the stationary seal ring 4 and the inner circumferential portion 32 of the casing, while permitting the stationary seal ring 4 to move back and forth (in the axial direction). That is, a ring-shaped first closed space 71 sealed by the first and second O-rings is formed between the outer circumferential portion of the stationary seal ring 4 and the inner circumferential portion 32 of the seal casing.

A ring-shaped O-ring stopper 43, which is located between the two O-rings 61 and 62 for limiting the backward movement of the first O-ring 61 and forward movement of the second O-ring 62, is provided on the outer circumferential portion of the stationary seal ring 4. A ring-shaped first O-ring stopper 34, which restricts the forward movement of the first O-ring 61, is formed on the inner circumferential portion 32 of the seal casing. Further, a ring-shaped second O-ring stopper 35, which limits the backward movement of the second O-ring 62, is provided on the same inner circumferential portion 32. These stoppers 34 and 35 and 43 keep the two O-rings 61 and 62 apart from each other by a distance within a specific range. That is, when the first and second O-rings 61 and 62 are moved backward or forward by the difference in pressure between inside and outside closed space 71, the two O-rings 61 and 62 will not approach or move apart from each other beyond a specific limit. In other words, even when the two O-rings 61 and 62 are moved in the axial direction because of the difference in pressure between inside and outside space 71, the moving scope of the two O-rings 61 and 62 is limited so that the two O-rings 61 and 62 move in the axial direction within a range and do not close openings of first and second passages 81, 82 (to be described later) to the closed space 71 in which the O-rings 61 and 62 are always positioned forwardly of and backwardly of the openings.

The diameter of the outer circumferential portion of the stationary seal ring 4 is not uniform. The diameter d2 of a second outer circumferential portion backward of the O-ring stopper 43 (i.e. adjacent the casing wall portion 33), with which the inner circumferential portion of the second O-ring makes contact, is smaller than the diameter d1 of a first outer circumferential portion 41 forward of the O-ring stopper 43 (i.e. adjacent the rotary seal ring), with which the inner circumferential portion of the first O-ring 61 makes contact. When a seal gas 8 (to be described later) is supplied into the first closed space 71, on account of d2<d1 a thrust force is produced by the pressure Ps of the seal gas (referred to hereinafter as "seal gas pressure"), which pushes the stationary seal ring in the direction of the rotary seal ring (i.e. in the forward direction). This thrusting force serves as a closing force T2 (referred to hereinafter as "seal gas closing force") and works to close the seal end faces 20 and 40. The closing force T2 is specified by the equation $$T2=(\pi/4)((d1)^2-(d2)^2)Ps.$$

Incidentally, the radius difference $\Delta r(=(d1/2)-(d2/2))$ between the outer circumferential portions 41 and 42 is set appropriately in view of structural conditions such as the diameter of the rotary shaft 10, the diameters D1 and D2 of the seal end faces 20 and 40, and also in consideration of the balance between the seal gas closing force T2, closing forces T1 and T3 (to be described later), and opening forces U1 and U2 (to be described later) as well as sealing effect (to be described later). It is generally desirable that the difference should be set within this range: $0 \text{ mm}<\Delta r \leq 5 \text{ mm}$.

The third O-ring 63 is placed between and suitably compressed by the inner circumferential portion of stationary seal ring 4 and the outer circumferential portion of inner cylinder portion 31 of the seal casing, as shown in FIGS. 1 to 3. The O-ring provides a secondary seal between the inner circumferential portion of the stationary seal ring 4 and the inner cylinder portion 31, while permitting the stationary seal ring 4 to move back and forth (in the axial direction). A ring-shaped second closed space 72, sealed between the third O-ring 63 and the aforesaid second O-ring 62, is formed between the back face of stationary seal ring 4 and casing wall portion 33. A ring-shaped third O-ring stopper 44, which limits the forward movement of third O-ring 63 in relation to stationary seal ring 4, is provided on the inner circumferential portion of stationary seal ring 4. Another ring-shaped stopper, which restricts the backward movement of third O-ring 61, is formed on inner cylinder portion 31.

A back pressure lead-in path 45, which connects inside region F and second closed space 72, is formed through stationary seal ring 4 (FIG. 2). The back pressure lead-in path 45 has an opening at the outer circumferential portion 48 outside of the seal end face of stationary seal ring 4 (i.e. at the ring-shaped portion outside of the seal end face 40 provided at the forward end of ring 4) and another opening on the back face of stationary seal ring 4. Through this back pressure lead-in path 45, the inside gas is led from the inside region F to the second closed space 72, so that a pressure equal to the inside pressure Pf is utilized as back pressure pf(=Pf) acting on the stationary seal ring 4. This back pressure pf produces a thrust force pushing the stationary seal ring toward the rotary seal ring. This thrusting force will act as a closing force (referred to hereinafter as "back pressure closing force") T1 working in a direction to close the seal end faces 20 and 40. It is noted that since the stationary seal ring 4 has third O-ring stopper 44, which limits the forward movement of third O-ring 63 in relation to the stationary seal ring 4, the inside diameter of the ring-shaped pressure receiving area on which the back pressure pf acts to produce back pressure closing force T1 will be the diameter Dm of the outer circumferential portion of the inner cylinder portion 31 of the seal casing with which the inner circumferential portion of the third O-ring comes into contact. Hence, since the outside diameter of the ring-shaped pressure receiving area is the diameter d2 of the second outer circumferential portion 42, the back pressure closing force T1 generated by the back pressure pf, given by the equation:

$$T1=(\pi/4)((d2)^2-(Dm)^2)pf,$$

changes in proportion to the pressure in the inside region F. It is also noted that the back pressure lead-in path 45 is positioned so as not to cross the second passage 82.

A plurality of springs 5 (one spring shown in the drawings), which press the stationary seal ring toward the rotary seal ring, are provided in second closed space 72. Those springs are arranged circumferentially in a ring-shaped area with the rotation axis as center at a specific interval between each neighboring two springs and placed between the back face of the stationary seal ring 4 and the casing wall portion 33.

The pushing strength of the respective springs is set to the minimum level necessary to satisfy the following two requirements. The first requirement is that the closing force (spring closing force) T3 generated by the pushing force (spring load) of all of the springs 5 is of the order necessary and sufficient to supplement insufficiency of the closing force, which the aforesaid closing forces T1 and T2 provide, in order to generate a counter force to balance the opening forces U1 and U2 (to be described later). The second requirement is that when the equipment is stopped with the supply of the seal gas 8 cut off, the spring closing force T3 will overcome the sliding frictional resistance of the O-rings 61 and 62 and 63, smoothly bringing and holding the stationary seal ring 4 in contact with the rotary seal ring 2 (so that no inside gas may leak out through between the seal end faces 20 and 40). The first requirement is generally included in the second requirement, in relation to the closing forces T1 and T2. The spring strength may be set to the minimum level within a range necessary to satisfy the second requirement.

Figure 4:
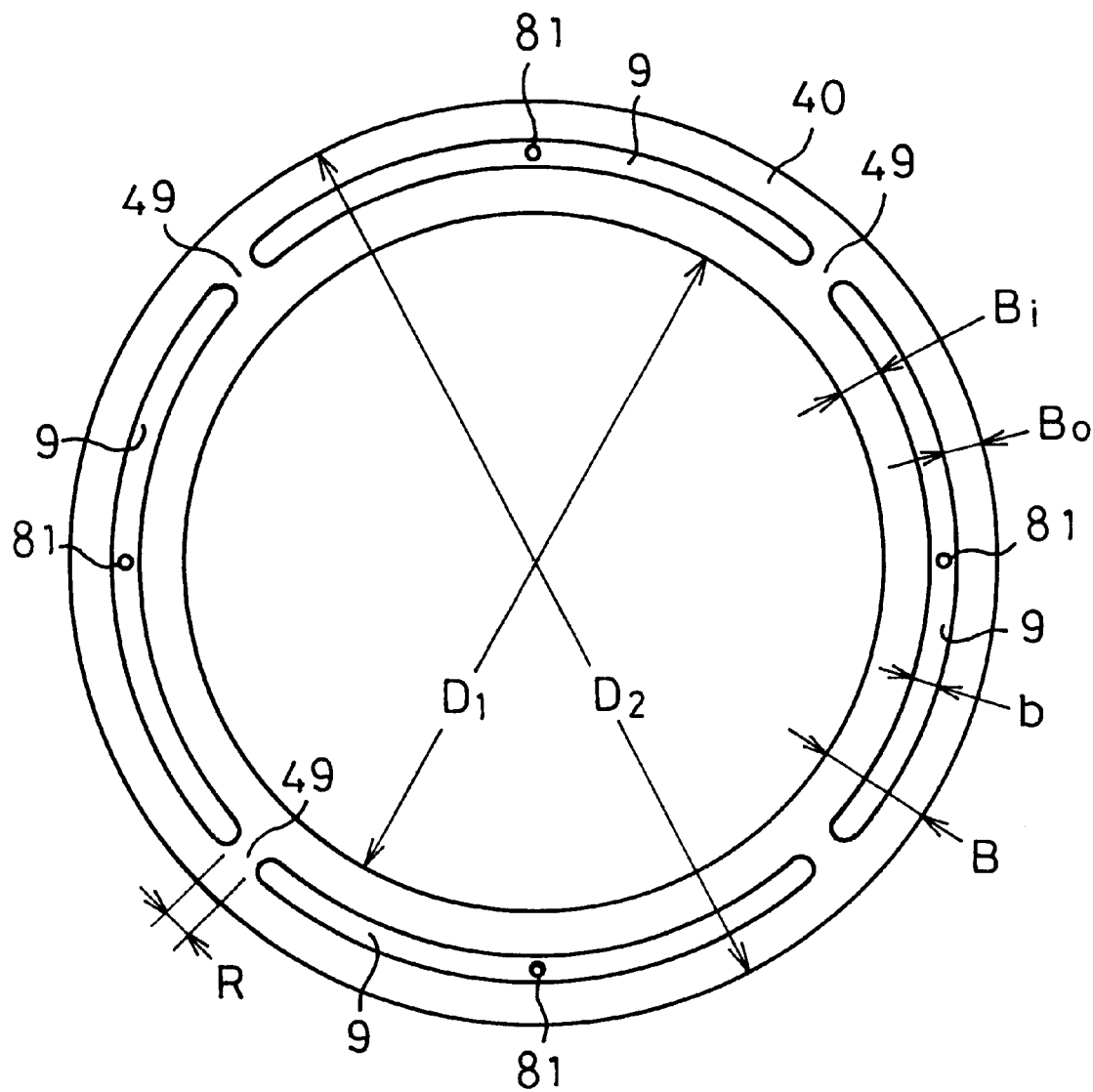
FIG. 4 is a front view of the seal end face of the stationary seal ring of the same non-contact gas seal.

A plurality of static pressure generating grooves 9, arranged in the form of a ring concentric with the seal end face 40, are formed on the stationary seal ring end face 40, as illustrated in FIGS. 3 and 4. The seal casing 3 and the stationary seal ring 4 are provided with a continuous seal gas supply channel 80 through which the seal gas 8, compressed to a higher degree than the inside pressure Pf, may be supplied to the static pressure generating grooves 9. As in prior art seal 101, the seal gas 8 led into the static pressure generating grooves 9 holds the seal end faces 20 and 40 in a non-contact state, while sealing off the inside region F from the atmospheric region A.

Seal gas supply channel 80 is a continuous one comprising a first passage 81 formed in seal casing 3 and a second passage 82 provided in stationary seal ring 4, these passages connected to each other through first closed space 71, as shown in FIGS. 1 and 3. The first passage is connect to a seal gas supply source (not shown) and has an opening at the casing inner circumferential portion 32 to communicate with first closed space 71. This opening is located directly opposite to the O-ring stopper 43 which keeps the first and second O-rings 61 and 62 apart from each other. One end of second passage 82 passes through the O-ring stopper 43 and has an opening in communication with first closed space 71, and the other end branches out and opens at the center of the longitudinal direction of the respective static pressure grooves 9.

A suitable squeezing mechanism 83 (in this example, an orifice), which has the same function as the orifice 183 as described earlier, is provided in second passage 82. The seal gas 8 is selected according to the seal conditions (such as the properties of the inside gas) from among those gases that are harmless even if allowed to flow into the regions F and A. That is, the seal gas should not affect the properties, composition, quality, and other aspects of the inside gas and should be harmless to humans. The seal gas of choice is generally nitrogen gas, which is inert to other gases and is harmless to the human body. It is noted that the seal gas 8 is supplied only when the rotary equipment which is equipped with the seal 1 is in operation, and the supply of seal gas is cut off when the operation is suspended. Normally, the equipment or the rotary shaft 10 is put in operation after the seal gas 8 has been supplied. That is, the operation is started after the seal end faces 20 and 40 have been put into a non-contact state. Also the supply of the seal gas 8 is cut off after the equipment or the rotary shaft has come to a complete stop.

Seal gas 8 is supplied to the first passage 81 from a seal gas supply source (not shown) and led to the respective static pressure grooves 9 from the second passage 82 via the orifices. The pressure Ps of the seal gas 8 as supplied from the source is controlled so that the pressure ps (pocket pressure) of the seal gas 8 in the respective static pressure generating grooves 9 is 0.5 to 1.5 bar higher than the inside pressure Pf for the following reasons: The distance R in the circumferential direction of the seal end face portion 49 between each two neighboring static pressure generating grooves 9 (referred to hereinafter as "land area between grooves") is designed to be exactly or roughly equal to the groove width b of the static pressure generating groove 9, if ps<Pf+0.5 bar, then the pressure distribution of the fluid film formed by the seal gas 8 between the seal end faces 20 and 40 varies greatly at the land areas 49 between grooves, with the fluid film pressure at the land areas 49 between grooves dropping below the inside pressure Pf. As a result, the inside gas can leak out to the outside region A through between the land areas 49 between grooves and the rotary seal end face 20. If ps>Pf+1.5 bar, on the other hand, then the leakage of the seal gas to the inside region F through between the seal end faces 20 and 40 will increase more than necessary.

In the present example, the seal gas pressure Ps is regulated so that Pf+1.5 bar≦Ps≦Pf+2.5 bar is maintained in order to keep the pocket pressure ps within the aforesaid range: Pf+0.5 bar≦ps≦Pf+1.5 bar. It is noted that in case there is no or if any only small fluctuation in the inside pressure Pf (a Pf fluctuation range between 0 and 0.3 bar, for example) while the equipment or the rotary shaft 10 is in operation, then the seal gas pressure Ps is kept fixed within a range which meets the above-mentioned conditions (Pf+0.5 bar≦ps≦Pf+1.5 bar or Pf+1.5 bar≦Ps≦Pf+2.5 bar). If the inside pressure Pf fluctuates violently in operation, with the fluctuation range of the inside pressure Pf exceeding 0.3 bar, for example, then the seal gas pressure PS, if kept at a fixed level, may fail to satisfy the aforesaid conditions. To cope with that, it is desirable to regulate the seal gas pressure Ps according to the change in inside pressure Pf so that the aforesaid conditions may be met. This regulation can be effected without difficulty by means of one of the known control systems, such as a differential pressure regulating valve. Needless to say, the seal gas pressure Ps may be regulated in accordance with changes in the inside pressure Pf even when the fluctuation range of the inside pressure Pf is small, say not higher than 0.3 bar.

Now, the seal gas 8 is led to the respective static pressure generating grooves 9 through seal gas supply channel 80. The static pressure (or the pocket pressure) ps rises and generates an opening force (seal gas opening force) U1 between the seal end faces 20 and 40, holding the seal end faces 20 and 40 in a non-contact state. This seal gas opening force U1 is combined with a thrusting force (inside gas opening force) U2 to push back the stationary seal ring 4. The inside gas opening force U2 is produced by the inside pressure Pf acting on the outer circumferential portion 48 outside of the seal end face of the stationary seal ring. With a combination of the seal gas opening force U1 and the inside gas opening force U2 in equilibrium with the closing forces T1, T2, and T3, the seal end faces 20 and 40 are kept in a non-contact state. It is noted that the inside gas opening force U2 is given by the following equation:

$$U2=(\pi/4)((d1)^2-(d2)^2)Pf.$$

As set forth, the spring dosing force T3 is joined by the back pressure closing force T1 and the seal gas closing force T2 to form the closing force. Unlike the prior art seal 101 in which the dosing force comes from the spring load alone, the present invention can substantially reduce the spring load to counter the opening forces U1 and U2, and can reduce the spring strength of each spring 5 to a minimum, as has been described.

It is notable that the static pressure-type non-contact gas seal of the present invention is designed as a pressure balanced-type seal suitable for use under high pressure conditions, because the second closed space 72 behind the back face of the stationary seal ring 4 is connected to the inside region F through the back pressure lead-in path 45, so that the inside pressure Pf is utilized to serve as back pressure pf to thrust the stationary seal ring 4, as has been explained. That is to say, the balance ratio K in this seal can be adjusted to not higher than 1. This balance ratio K, as with the known balance-type seals, can be defined by the inside diameter D1 and the outside diameter D2 of the seal end faces 20 and 40 and the inside diameter of the ring-shaped pressure receiving area of the stationary seal ring 4 on which the back pressure Pf acts, that is the diameter Dm of the inner circumferential portion contact surface of the third O-ring. For design purposes, K can be given by the following equation:

$$K=((D2)^2-(Dm)^2)/((D2)^2-(D1)^2).$$

Figure 7:
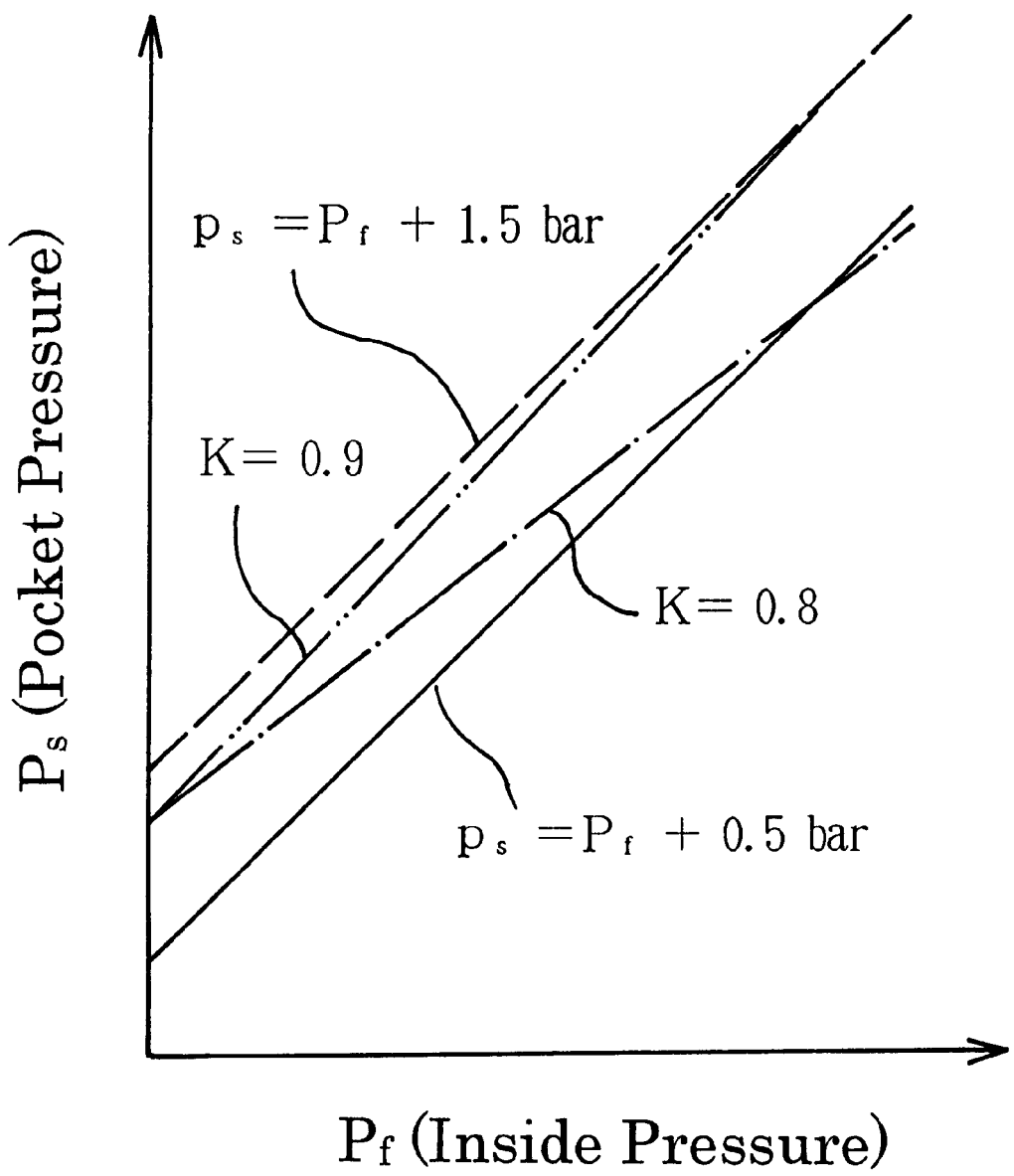
FIG. 7 is a graphical representation of the relationship between the balance ratio, the pocket pressure (seal gas pressure in the static pressure generating grooves), and the pressure inside the machine (pressure in the sealed fluid region).
Figure 8:
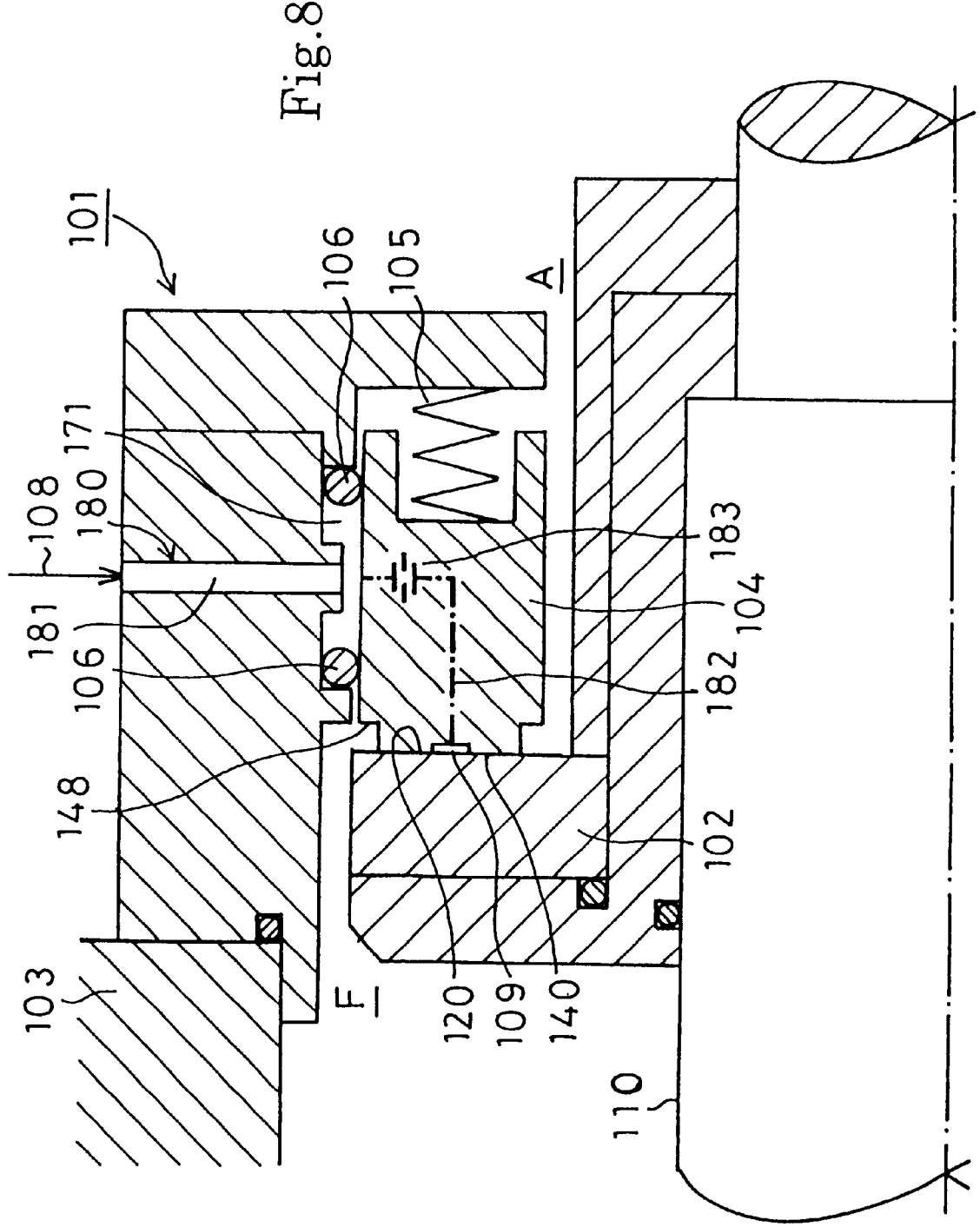
FIG. 8 is a longitudinal half sectional view showing a prior art gas seal.

At the same time, in the static pressure-type non-contact gas seal 1 of the present invention, the applicable scope of the inside pressure Pf will be narrow if the pocket pressure ps is to be maintained, with K<0.8 or 0.9<K≦1, within this range: Pf+0.5 bar≦ps≦Pf+1.5 bar, as shown in FIG. 7. For this reason, to obtain a wide applicable range of pressure, with the conditions Pf+0.5 bar≦ps≦Pf+1.5 bar satisfied, the balance ratio $K=((d2)^2-(dm)^2)/((D2)^2-(D1)^2)$ is set to 0.8≦K≦0.9.

The static pressure generating grooves 9 each are arc-formed, with curvature in which the axis of the stationary seal ring 4 serves as center, and are all identical in shape. The number of grooves provided is generally 3 to 12, and is selected appropriately depending on the seal specifications such as inside diameter D1 and outside diameter D2 of the seal end face 40 of the stationary seal ring 4. In the present example, four static pressure grooves 9 are formed in the circumferential direction on the seal end face 40 of the stationary seal ring 4, at the same interval R between each two neighboring grooves.

The depth L of the static pressure grooves 9 is uniform and determined in the range of 0.3 mm≦L≦1.0 mm. The reason that the depth is limited to that range is this: If L>1.0 mm, the volume of the inner space of the grooves will be so large that instability phenomena arise, caused by compressibility of the seal gas 8. For example, the pocket pressure pf will fluctuate and can cause the stationary seal ring 2 to vibrate. That is because while the orifice 83 squeezes the seal gas 8 uniformly (uniform in pressure reduction), the effect of squeezing the seal gas 8 by seal end faces 20 and 40 is affected by the change in the gap between the seal end faces 20 and 40. While there will be no change in the pressure of the seal gas 8 at the upstream side of the orifice 83 due to the change in the gap between the seal end faces 20 and 40, the gap change can change the pressure of the seal gas 8 at the downstream side or in the static pressure generating grooves 9, causing a kind of self-excited vibration. On the other hand, L<0.3 mm would tend to bring about non-uniform pressure distribution of the pocket pressure ps in the longitudinal direction of the groove. When, for example, the seal gas 8 is led to the center of the static pressure generating grooves 9 from the second passage 82, the seal gas 8 cannot reach the two longitudinal ends sufficiently, but leaks out of the static pressure generating grooves along the way.

The static pressure generating grooves 9 have the same groove width b which is selected, for the reasons described below, so as to meet the following conditions: 0.05≦b/B≦0.03 where B is seal end face radial width (=(D2−D1)/2) of the seal end faces 20 and 40. The groove width b<0.05 B or b/B<0.05 could not produce a sufficient seal gas opening force U1 to match the pocket pressure ps. The seal gas opening force U1 would be too small. As a result, to balance the opening force and the closing force, the pocket pressure ps or the seal gas pressure Ps would have to be raised more than necessary. If, on the other hand, the groove width b is larger than 0.3 B or b/B>0.3, then the seal gas opening force U1 will be too large. As a result, to balance the opening force and the closing force, the closing force would have to be increased more than necessary, for instance by increasing the spring strength.

It is designed that the circumferential interval R between each two neighboring grooves 9, or the width of the land area 49 between the grooves 9, is equal to the aforesaid groove width b, for the purposes of preventing, to the greatest extent possible, the pressure of seal gas 8 from changing (falling) at the land area 49, and of keeping the pressure distribution of the fluid film between the seal end faces 20 and 40 uniform in the circumferential direction. To be specific, the interval R is set generally in the range of 1 to 4 mm, depending on the inside and outside diameters of the seal end faces 20 and 40.

The position of the static pressure grooves 9 in the radial direction is specified by the radial distance from the outer edge of stationary seal ring end face 40 to the static pressure generating grooves 9 (referred to hereinafter as "outer land width" Bo) or the redial distance from the inner edge of stationary seal ring end face 40 to the static pressure generating grooves 9 (referred to hereinafter as "inner land width") Bi. This outer land width Bo or inner land width Bi is designed as follows: $0.3 \text{ B} \leq \text{Bo} \leq 0.7 \text{ B–b}$ or $0.3 \text{ B} \leq \text{Bi} \leq 0.7 \text{ B–b}$, on the premise that the groove width b and the seal face width B satisfy the equation $$B-b=Bo+Bi.$$

If Bo<0.3 B or Bi>0.7 B–b, the leakage of the seal gas into the inside region F will increase irrespective of the other conditions, with an uneven pressure distribution in the radial direction of the fluid film between the seal end faces 20 and 40. As a result, parallelism between the seal end faces 20 and 40 is lost and it is difficult to hold the seal end faces 20 and 40 in a proper non-contact state. Further, Bi<0.3 B or Bo>0.7 B–b would increase leakage of the seal gas into the outside region A irrespective of the other conditions. Also, the pressure distribution in the radial direction of the fluid film between the seal end faces 20 and 40 would be non-uniform. The parallelism broken, it is difficult to hold seal end faces 20 and 40 in a proper non-contact state. By changing the outer land width Bo or inner land width Bi within the above-mentioned ranges, the leakage into the regions F and A can be adjusted at will. For example, if the leakage of the seal gas into the inside region F is to be reduced, the outer land width Bo should be increased. To reduce the leakage of the seal gas into the outside region A, the inner land width Bi should be enlarged.

By setting static pressure generating groove width b, groove depth L, inter-groove land area width R, outer land width Bo, and inner land width Bi as described above, it is possible, to the greatest possible extent, to reduce leakage of the seal gas into the respective regions F and A and to maintain seal end faces 20 and 40 in a proper non-contact state, thereby achieving an effective sealing result.

It is understood that the static pressure-type non-contact gas seal 1 of the present invention is not restricted to those examples just described, but can be easily varied or modified without departing from the spirit and basic principle of the present invention.

Figure 5:
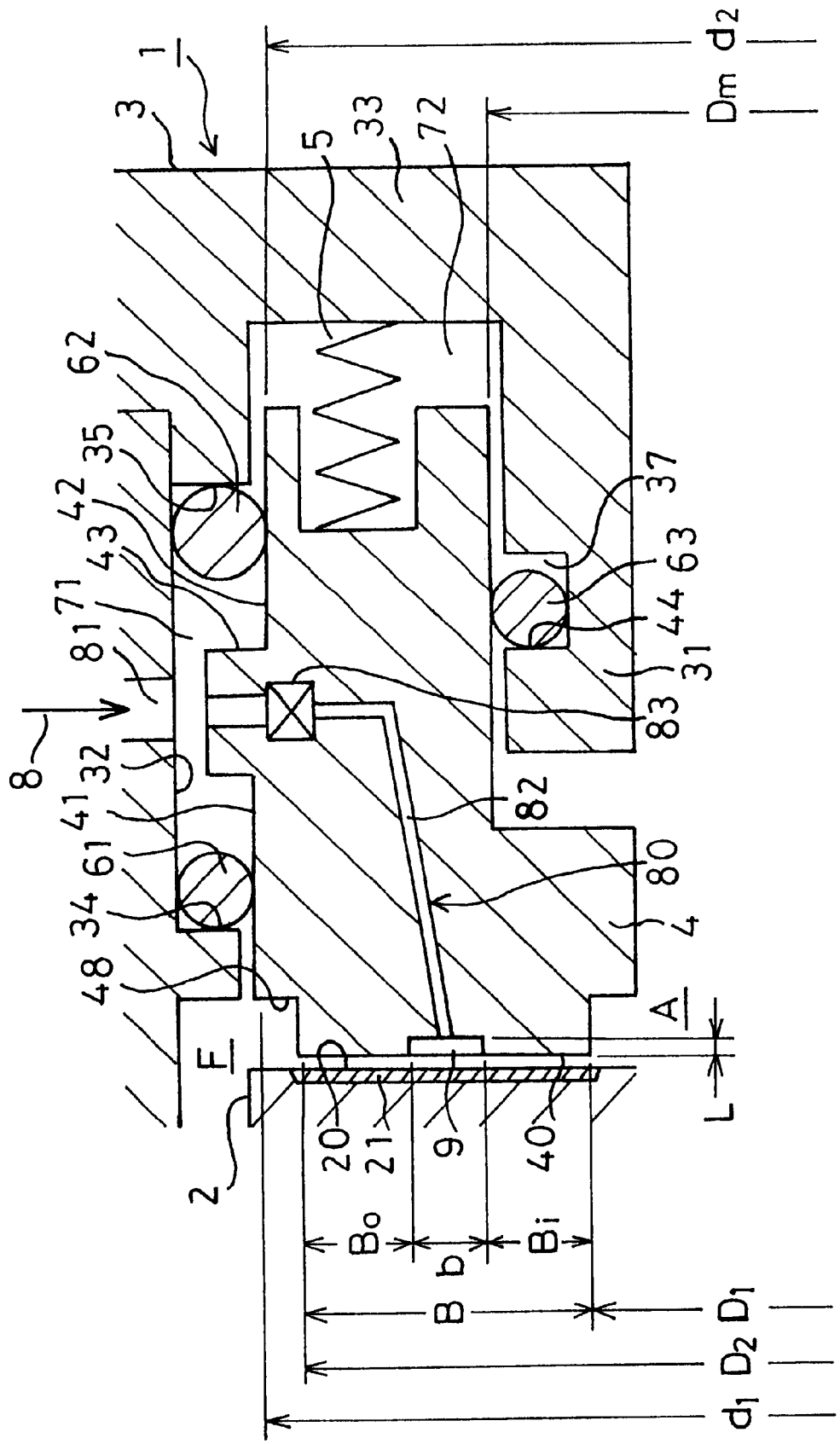
FIG. 5 is a longitudinal half sectional view equivalent to FIG. 3, showing another non-contact gas seal example of the present invention.

For example, third O-ring stopper 44 may be formed in inner cylinder portion 31 of the seal casing, as shown in FIG. 5. That is, the third O-ring 63 is put and held in a ring-shaped groove 37 formed in the outer circumferential portion of the inner cylinder portion 31, with the front end wall of this ring-shaped groove 37 serving as the third O-ring stopper 44. In this arrangement, Dm, which determines the back pressure closing force T1 and the balance ratio K, is the diameter of the inner circumferential surface of the stationary seal ring with which the outer circumferential portion of the third O-ring 63 comes into contact.

Figure 6:
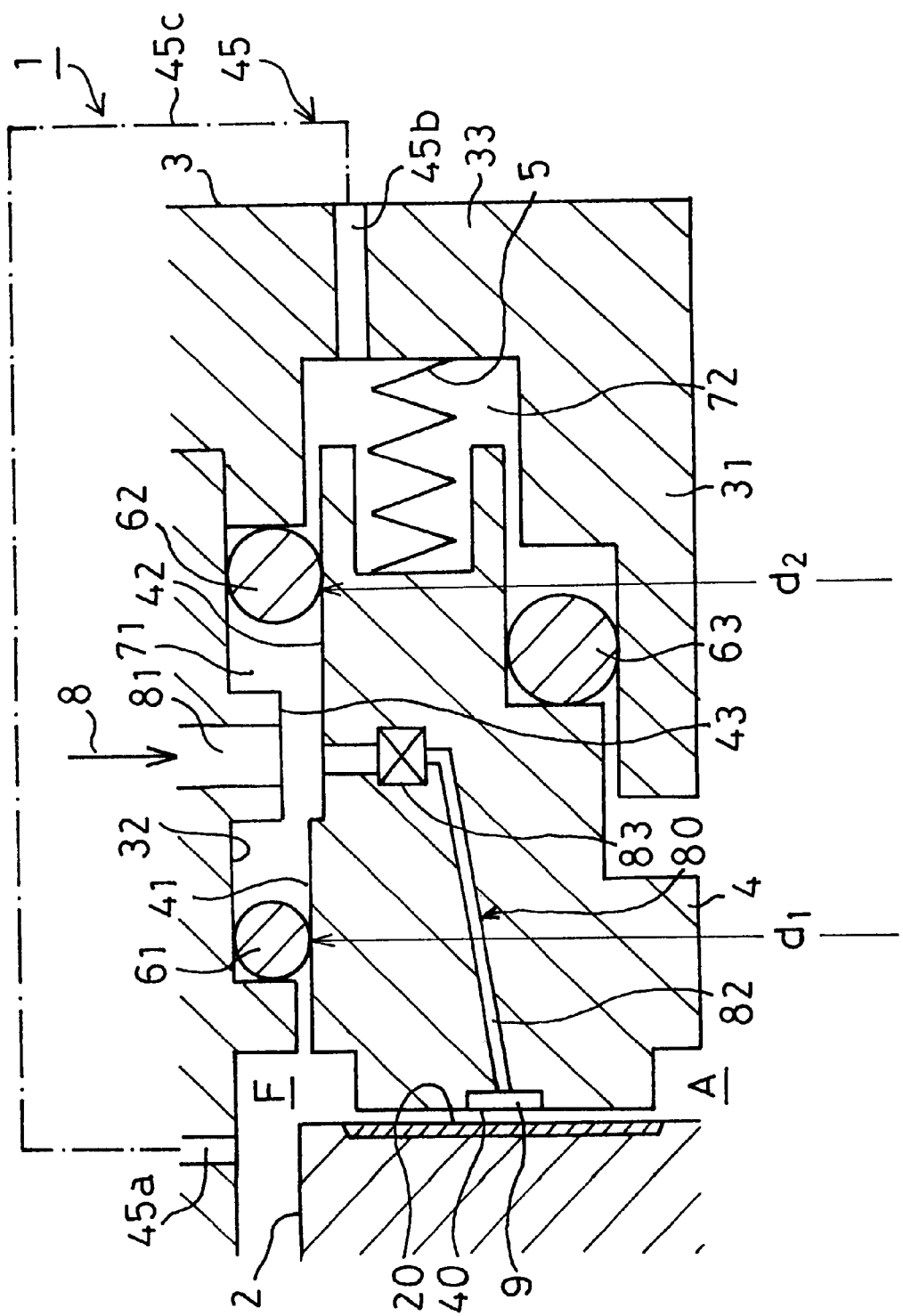
FIG. 6 is a longitudinal half sectional view equivalent to FIG. 3, showing still another non-contact gas seal example of the present invention.

Also, O-ring stopper 43 which restricts movement in the axial direction of the first and second O-rings 61 and 62 can be provided on inner circumferential portion 32 of the seal casing, as shown in FIG. 6. In this arrangement, first seal gas passage 81 leads to first closed space 71 through the O-ring stopper 43.

In another modification, back pressure lead-in path 45 is formed out of a through hole 45*a*, provided at a place of the seal casing opposite to the inside region F, and another through hole 45*b*, provided at a place of the seal casing opposite to the second closed space 72 (that is, the casing wall portion 33), connected by a suitable piping 45*c*, mounted outside of the seal casing 3.

What is claimed is:

1. A static pressure-type non-contact gas seal comprising:
    a seal casing having an inner cylinder portion, a circular inner circumferential portion concentrically surrounding said inner cylinder portion, and a ring-shaped wall portion connecting said two portions,
    a rotary seal ring fixed to a rotary shaft concentrically running through said inner cylinder portion of the seal casing,
    a stationary seal ring whose outer circumferential portion is held on the inner circumferential portion of the seal casing via a first O-ring and a second O-ring, said two O-rings arranged side by side with a specific interval therebetween, whose inner circumferential portion is held on said inner cylinder portion of the seal casing via a third O-ring, and which is slidable in the axial direction in a state where the stationary seal ring is opposite to the rotary seal ring, wherein the diameter of the second outer circumferential portion in contact with the inner circumferential portion of said second O-ring is smaller than the diameter of the first outer circumferential portion in contact with the inner circumferential portion of said first O-ring which is closer to said rotary seal ring than said second O-ring,
    springs placed between the stationary seal ring and said casing wall portion to thrust said stationary seal ring onto said rotary seal ring,
    a rotary seal end face and a stationary seal end face, both with the same inside diameter and outside diameter and each formed on the respective opposing ends of the two seal rings,
    a plurality of static pressure generating grooves formed on the seal end face of the stationary seal ring, arranged to cooperate to form a ring concentric with said end face of the stationary seal ring,
    a first closed space formed in the shape of a ring between the inner circumferential portion of the seal casing and the outer circumferential portion of said stationary seal ring and sealed by said first O-ring and said second O-ring,
    a second closed space formed in the shape of a ring between said casing wall portion and the back face portion of said stationary seal ring and sealed by said second O-ring and said third O-ring,
    a continuous seal gas supply channel formed in the seal casing and the stationary seal ring which supplies the seal gas to said static pressure generating grooves through said first closed space, said seal gas compressed to a higher pressure than the pressure in the sealed fluid region at the outer circumferential side of the two seal end faces, and
    a back pressure lead-in path connecting the sealed fluid region and the second closed space.

2. The static pressure-type non-contact gas seal as defined in claim 1, wherein the groove width b of the static pressure generating grooves formed on the seal end face of the stationary seal ring is so selected that a ratio of the groove width b to the radial width or seal face width B of the seal end face of said stationary seal ring, i.e., b/B, is $0.05 \leq b/B \leq 0.3$.

3. The static pressure-type non-contact gas seal as defined in claim 2, wherein the radial distance $B_o$ from the outer edge of the seal end face of the stationary seal ring to the static pressure generating groove or the radial distance $B_i$ from the inner edge of the seal end face of the stationary seal ring to the static pressure generating groove is so selected that $0.3\ B \leq B_o \leq 0.7\ B-b$ or $0.3\ B \leq B_i \leq 0.7\ B-b$ is achieved, provided that the relation represented by $B-b=B_o+B_i$ exists.

4. The static pressure-type non-contact gas seal as defined in claim 1, wherein the depth L of the static pressure generating grooves is 0.3 to 1.0 mm.

5. The static pressure-type non-contact gas seal as defined in claim 2, wherein the circumferential distance between each two neighboring static pressure generating grooves is identical with the groove width of the static pressure generating groove.

6. The static pressure-type non-contact gas seal as defined in claim 1, wherein the pressure of the seal gas to be led to the static pressure generating grooves is 0.5–1.5 bar higher than the pressure in the sealed fluid region.

7. The static pressure-type non-contact gas seal as defined in claim 1, wherein a third O-ring stopper to prevent the third O-ring from movement toward the rotary seal ring due to pressure of the sealed fluid led to the second closed space is provided on the stationary seal ring or the inner cylinder portion of the seal casing and wherein the balance ratio K given by the equation $$K=((D2)^2-(Dm)^2)/((D2)^2-(D1)^2)^2$$

is adjusted so that $0.8 \leq K \leq 0.9$ is achieved, said balance ratio defined by the diameter Dm, in the case in which said third O-ring stopper is formed on the stationary seal ring, of a portion of the seal casing in contact with the inner circumferential portion of the third O-ring or, in the case in which said third O-ring stopper is formed on the inner cylinder portion of the seal casing, of a portion of the stationary seal ring in contact with the outer circumferential portion of the third O-ring, and the inside diameter D1 and the outside diameter D2 of the seal end faces.

* * * * *